UNITED STATES PATENT OFFICE.

JOHANN KARL KESSLER, OF MILWAUKEE, WISCONSIN, ASSIGNOR TO HIMSELF, MORRIS ROTH, AND GEORGE SYLVESTER, ALL OF SAME PLACE.

PROCESS OF MAKING SPONGE-LEAD.

SPECIFICATION forming part of Letters Patent No. 292,753, dated January 29, 1884.

Application filed March 17, 1883. Renewed January 7, 1884. (No specimens.)

*To all whom it may concern:*

Be it known that I, JOHANN KARL KESSLER, a subject of the Emperor of Germany, residing at Milwaukee, in the county of Milwaukee and State of Wisconsin, have invented a new and Improved Process of Preparing Sponge-Lead for the Manufacture of Lead Salts, especially white lead and red lead; and I hereby declare the following to be a full, clear, and exact description of the same.

I shall describe my process first as applied to the production of white lead, and secondly as applied to the production of red lead.

In manufacturing white lead, as heretofore commonly practiced, metallic lead in sheets is exposed to the combined action of air, carbonic-acid gas, and vapors of vinegar, in chambers specially constructed for the purpose. The surface of the sheets, when so exposed, soon becomes covered with a gradually-increasing layer of basic carbonate of lead, while the lead itself is being consumed. This oxidation is, however, a very slow process, as the oxygen can only operate upon the surface, and more or less of the metal remains unconverted and in a condition which altogether unfits it for further manufacture into white lead. In order to hasten this slow process of oxidation, many mechanical improvements have been suggested; but little has heretofore been accomplished in curtailing the time, loss, and expense attending such mode of manufacturing.

The object of my invention is to avoid entirely the use of acetic acid and the consequent expense, and at the same time to prevent loss of lead and greatly shorten the time of manufacturing. My method is based upon the action on lead of an electric current in an electrolyte consisting of the acetate of an alkali in solution, and is allied to the process described by me in a former application for Letters Patent of the United States relating to the manufacture of verdigris and other copper compounds, since, while the lead to be oxidized is deposited in extremely fine spongious particles at the negative pole, the electrolyte constantly regenerates itself. When so treated and minutely subdivided, as aforesaid, the metallic sponge very readily oxidizes, and indeed so eagerly absorbs oxygen that it frequently turns red-hot. If this spongious lead so prepared is brought into contact with an atmosphere containing not only oxygen but also carbonic-acid gas, then it readily absorbs both, and white lead is the result. This last stage in my process is not very different from the old mode of manufacturing; but what my invention consists in is the conversion of the solid lead into sponge-like minute particles by the action of an electric current and a solution of the acetate of an alkali, as hereinafter particularly described, and so preparing the same for further treatment and manufacturing, as above indicated.

In order to carry out my process I consider preferable the use of a suitable magneto-electric machine operated by a steam-engine, of which, however, nothing in particular need be said, as they are sufficiently known. I also use one or more large dissolving cells, tanks, or vessels, made of wood or non-conducting material, and familiar to all persons acquainted with the art. I find the square box form preferable. This box I fill with a solution of acetate of potassium or acetate of sodium. In the center of the box I place a sheet of lead, around which I group the metal intended to be transformed, but in such a manner that while all the pieces connect with each other they nowhere touch the lead sheet in the center. I then connect the center sheet with the negative pole of the magneto-electric machine and the surrounding metal with the positive pole. This being done, my preparations are complete. The magneto-electric machine being set in motion, the lead at the positive pole is gradually dissolved and passes toward the negative pole, where it is deposited upon the surface of the lead cathode in the form of a soft, coherent spongious mass, which grows rapidly, and has to be removed from time to time for further treatment, as hereinafter described.

In order to insure the best results and a copious continuous sponge-like deposit, as aforesaid, the metal at the positive pole as rapidly as it dissolves ought to be replenished. If this be done, the process will successfully and continuously operate as long as the magneto-electric machine is in motion and the current remains unbroken, as the electrolyte regenerates itself, and nothing is lost in the operation. An occasional stirring of the solution will also at times be found advantageous, as the heavy lead solution is apt to sink toward the bottom of the dissolving-tank, and hence may not otherwise come in contact with the full surface of the sheet of lead used as a cathode, and may thereby accumulate too much at the lower end.

One or more processes have been described heretofore for preparing sponge-lead by electrolysis and converting it into white lead; but so far as I am aware no such process has ever before proved practically useful. The essence of my invention lies in the particular solutions which I employ in preparing the sponge-lead, there being of course no special novelty in converting that substance, when once obtained, into white lead or red lead. A process for preparing sponge-lead by electrolysis and converting it into white lead is described in the British patent to Lyte, No. 4,491 of 1877; but, compared with my direct process above outlined, that process is very troublesome and laborious, since in order to obtain the sponge-lead the ore or metallic lead must first be converted into chloride or sulphate of lead by means of zinc, requiring considerable time and great waste of material, thus giving little if any advantage for the manufacture of white lead over the ordinary process hereinbefore described. A process has been patented in the United States for dissolving the lead by solvents excited by electricity, leaving the impurities undissolved, and at the same operation depositing the lead separately in a purified form. The solutions named, however, are not the solutions employed by me, and while suitable, perhaps, for the purpose for which they are intended, they could none of them be employed advantageously, and some of them not at all, in carrying out my process. The sponge-like deposit prepared by my process, hereinbefore described, after being washed in clean water and pressed out, in order to free it from still adhering traces of the acetic solution, is then removed to suitable chambers, where it can be brought into contact with carbonic-acid gas, air, and steam. As to these chambers nothing need be said, as they may be constructed like those now in use. The same is substantially true of the subsequent treatment by carbonic-acid gas, air, and steam. However, it may be well to remark that lead prepared by my process will permit of the access of carbonic-acid gas and air in much larger quantities than under the old mode of treatment, because the power to oxidize and absorb is vastly greater than when solid coherent pieces of metal are sought to be transformed, and consequently my process is much quicker.

The use of steam I especially recommend, in order to check somewhat the disposition of the metallic sponge to become hot by too rapid oxidation. This last stage of my treatment or process may be considered at an end when the dark-gray sponge-like metal deposit has been fully converted into a white powder, which object is very rapidly accomplished. The product so obtained is then washed (if found necessary) and dried, when it is ready for market. Prepared as above, it will especially excel by its extraordinary capacity for covering.

The manufacture of red lead, as commonly practiced, is also a tedious process, requiring considerable time and large quantities of fuel. Metallic lead is melted in blast-furnaces, so that the air has constant and free access to the surface of the melting mass. The lead thereby becomes covered with a thin gray pellicle, being oxide of lead, which from time to time is removed. A bright red surface is again presented to the influence of the air, and in this manner, by constant removal of the upper surface of the melting lead, the process of oxidation is continuously carried out until the whole metal has been converted into oxide of lead. The product so obtained is again exposed to a red heat, while the air is freely admitted, and gradually we find the same thereby transformed into a yellow powder, which is called "massicot," or protoxide of lead. This powder is finely pulverized by crushers, and, when dry, placed in ovens specially constructed for that purpose, where it is again strongly heated under copious access of air until the yellow powder is fully converted into red lead. By my new process these various complicated manipulations may be altogether avoided, and red lead may be readily obtained by taking white lead, produced, in the manner above described, from the sponge-like metallic deposit hereinbefore referred to, and merely exposing the same to the influence of air and red heat. I recommend for that purpose the red-lead ovens now in common use. They are constructed in the form of molds, having flat bases constructed of tiles. The flames circulate on all sides of the oven, so that it becomes red-hot. The white lead is thinly spread out in this oven, and while exposed to a strong heat it gradually changes color. At first it turns into a beautiful light yellow, then orange color, and after a while it becomes red. When this red color is sufficiently intense, the process is completed. Red lead so prepared, aside from the rapidity and cheapness of its preparation, far excels in beauty of appearance that prepared by the ordinary or old mode of manufacturing. Other well-known lead compounds used in commerce—such as litharge—may also be produced from the initial spongious product obtained by my process by suitably varying the subsequent treatment.

The especial advantage of the particular electrolytes recommended—acetate of potassium and acetate of sodium—is that either of them, while dissolving the lead perfectly, will also regenerate itself, thus rendering the operation continuous without waste. If any other electrolyte be substituted for the ones named, it should, in order to be practical, possess like properties.

What I claim as new, and desire to secure by Letters Patent, is—

In the manufacture of white lead or other commercial salts of lead, the process of making sponge-lead which consists in passing an electric current, by means of a lead anode, through a solution of the acetate of an alkali, substantially as described.

JOHANN KARL KESSLER.

In presence of—
   GEO. L. JONES,
   HENRY GOLL.